United States Patent [19]

Lanzara

[11] Patent Number: 4,979,445
[45] Date of Patent: Dec. 25, 1990

[54] MAGNETICALLY LEVITATED VEHICLE WITH SUPERCONDUCTING MIRROR SHEETS INTERACTING WITH GUIDEWAY MAGNETIC FIELDS

[76] Inventor: Giovanni Lanzara, Via B. Buozzi 53, Rome, Italy, 00197

[21] Appl. No.: 302,397

[22] Filed: Jan. 26, 1989

[51] Int. Cl.⁵ ............................................. B60L 13/08
[52] U.S. Cl. .................................. 104/281; 505/902; 505/904
[58] Field of Search ................ 104/281, 282, 283; 505/902, 903, 904, 905, 906, 907, 908, 932

[56] References Cited

U.S. PATENT DOCUMENTS

| | | | |
|---|---|---|---|
| 3,664,268 | 5/1972 | Lucas et al. | 104/281 |
| 3,768,417 | 10/1973 | Thornton et al. | 505/906 |
| 3,892,185 | 7/1975 | Guderjahn | 104/281 |
| 3,937,150 | 2/1976 | Miericke et al. | 505/904 |
| 4,013,906 | 3/1977 | Eastham | 104/282 |
| 4,055,123 | 10/1977 | Heidelberg | 104/282 |
| 4,273,054 | 6/1981 | Yamashita et al. | 104/281 |
| 4,299,173 | 11/1981 | Akima et al. | 505/904 |
| 4,828,685 | 5/1989 | Stephens | 505/932 |

FOREIGN PATENT DOCUMENTS

| | | | |
|---|---|---|---|
| 2165343 | 7/1973 | Fed. Rep. of Germany | 104/281 |
| 2523888 | 12/1976 | Fed. Rep. of Germany | 104/282 |

Primary Examiner—Joseph F. Peters, Jr.
Assistant Examiner—Virna Lissi Mojica
Attorney, Agent, or Firm—Flehr, Hohbach, Test, Albritton & Herbert

[57] ABSTRACT

A magnetically levitated vehicle in which on-board sheets of superconductive material interact with guideway magnetic fields to levitate, drive, and brake the vehicle.

16 Claims, 2 Drawing Sheets

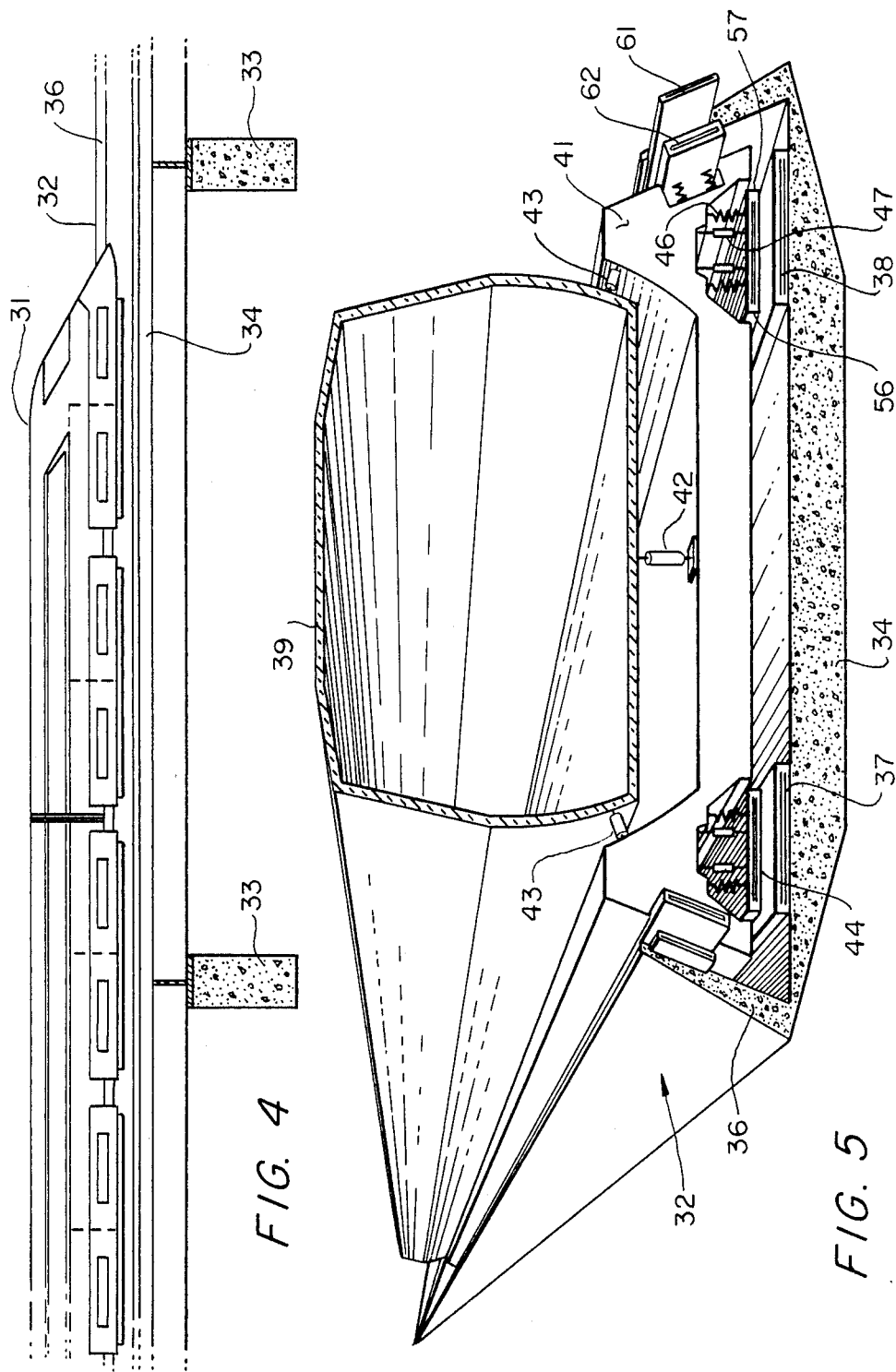

MAGNETICALLY LEVITATED VEHICLE WITH SUPERCONDUCTING MIRROR SHEETS INTERACTING WITH GUIDEWAY MAGNETIC FIELDS

This invention relates generally to magnetically levitated trains and more particularly to a magnetically levitated train using on-board superconducting sheets which interact with the guideway magnetic fields to levitate, guide and propel the train.

BACKGROUND OF THE INVENTION

High speed ground transportation systems with magnetically levitated vehicles are well known. At the beginning of the century, Graemiger proposed a levitation system based on magnetic attraction between an electromagnet in the vehicle and an overhead steel rail.

Bachelet proposed a system wherein the vehicle was suspended by repulsion generated by the interaction of magnetic fields excited in a coil mounted on the vehicle and fields generated by currents induced in a conducting plate. In order to reduce losses, passive loops or coils were substituted for the conducting sheet.

To better understand the prior art and the improvement of this invention, reference is made to FIG. 1, where a prior art levitated train 11 is illustrated traveling along a track or guideway which includes a conductive sheet 12. Eddy currents are induced in the sheet by the magnetic fields generated by the on-board coils. For purposes of illustration, a single coil 13 is shown mounted within the train 11. The interaction between the fields generated by the coils in the moving train and the fields generated by induced eddy currents in the conducting sheet 12 produce a repulsion or lifting or levitational force $F_L$.

The force, $F_L$, depends on the magnetic field generated in the coil and on the repulsion magnetic fields in the guideway or track. The magnetic fields in the guideway 12 are dependent on the speed of the vehicle since the induced currents are dependent on changes in flux. At higher velocity the changes in flux increase, thereby increasing the generated current and providing stronger magnetic fields and repulsion forces. The total force generated to levitate the train is dependent upon the number of coils and the train's speed. The conducting sheet has high resistive losses which can be considered a drag force, shown by $F_D$. It had been proposed to substitute individually spaced low resistance coils as replacement for the conducting sheet to thereby lower the resistance and decrease the losses.

As the train speed is increased and the induced currents increase, the repulsion forces increase. Mechanical and electrical means have been provided for limiting the lift. Recently there has been proposed an elevated train with an on-board superconducting coil for generating the magnetic fields that interact with coils along the guideway.

Prior art electromagnetic suspension and propulsion systems present various problems. First, the trains must move at a predetermined speed or velocity before the induced currents generate fields which are of sufficient magnitude to suspend the train. Initially the train travels on wheels, and as it gains speeds it induces sufficient currents which provide repulsion magnetic fields which levitate the train. The magnetic fields for levitation are usually very high. Expensive and heavy shields are required to shield the passengers from the fields. In systems using superconducting coils, the weight, complexity and cost of the on-board refrigeration systems becomes relatively high. Because of the inherent instability due to changes in $F_L$ with speed, expensive control systems are needed to improve the dynamic stability.

OBJECTS AND SUMMARY OF THE INVENTION

It is an object of this invention to provide an improved levitated train using on-board superconducting sheets which interact with and repulse the guideway magnetic fields to generate the levitational forces.

It is another object of this invention to provide a stable, efficient levitated train system.

It is a further object of the invention to provide a train system which on-board high temperature superconducting sheets or films which support persistent currents which generate electromagnetic fields which interact, with the guideway magnetic fields to repulse the fields and levitate and propel the train.

It is further object of this invention to provide a magnetically levitated train employing magnetic sheets or films in which the sheets can be tilted to provide not only levitational, but also propulsional forces to propel the train along the guideway or track.

It is a further object of the invention to provide a magnetically levitated train which rides on a C-shaped track with magnetic means on the sides and bottom of the track which interact with magnetic fields generated by persistent currents in on-board high temperature superconductor films to guide and propel or brake the train.

It is another object of the invention to provide a magnetically levitated train wherein films of superconducting material are housed in a container filled with cooling liquid which maintains the films in the superconducting state. THe superconductive films repulses the magnetic fields of the track and guide rail to provide levitational, propulsion and guidance forces.

The foregoing and other of this invention are achieved by magnetically levitated train which carries on-board films or sheets of superconducting materials which provide a magnetic mirror to the guideway magnetic fields to generate repulsion or levitational forces which levitate, propel and guide the train along a U-shaped or C-shaped guideway.

BRIEF DESCRIPTION OF THE DRAWINGS

The foregoing and other objects of the invention will be more clearly understood from the following description taken in connection with the accompanying drawings.

FIG. 4 is a side elevational view partly in section of a train in accordance with this invention.

FIG. 5 is an enlarged sectional perspective view showing the train system of FIG. 4.

DETAILED DESCRIPTION OF THE DRAWINGS

This invention depends upon the phenomena known as the Meissner effect. In the Meissner effect, magnetic fields which impinge upon a superconductor surface generate eddy currents which give rise to magnetic fields at the surface of the superconducting sheet and repulse the magnetic fields.

Figure 1:
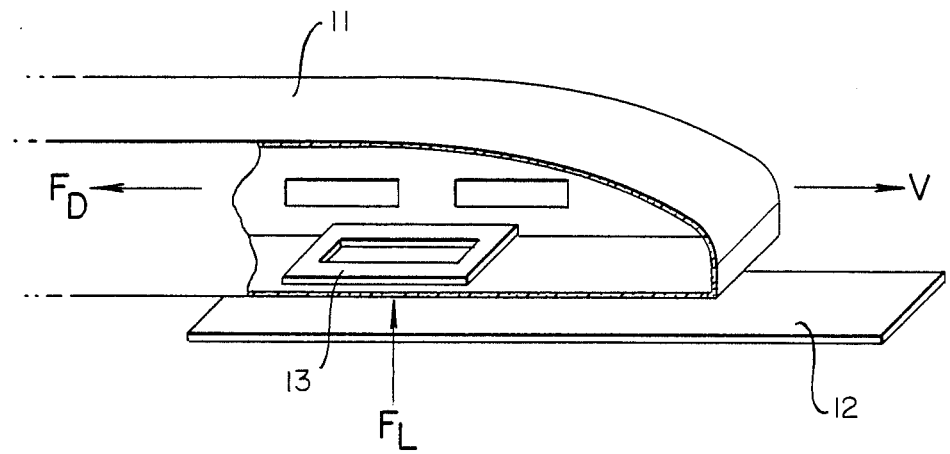
FIG. 1 is a partial perspective view showing a train in accordance with the prior art.
Figure 2:
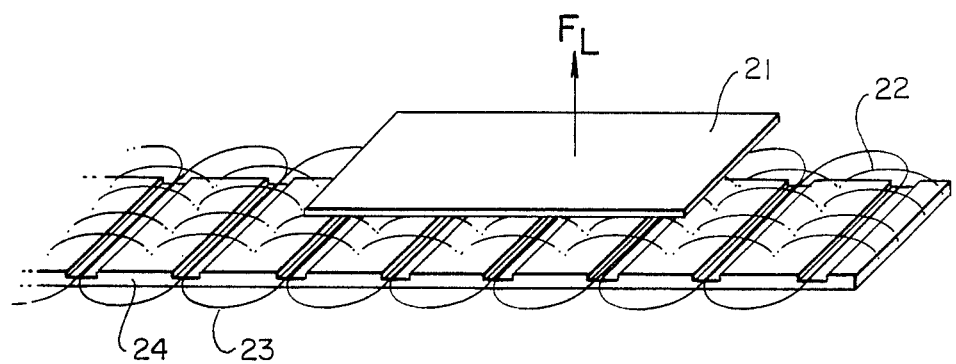
FIG. 2 is a perspective view illustrating the principles of the present invention.

Referring to FIG. 2, a sheet or film 21 of superconducting material is shown. For example, a film of high temperature superconducting material such as yttrium, barium, copper oxide deposited on a strontium titanate substrate. Other high temperature superconducting films may be used in the present invention. The film of superconducting material interacts with the magnetic fields 22 generated by the coils 23 embedded in the grooved support 24 which also serves as a low reluctance return path for the magnetic fields generated by the coils. The fields 22 are shown as longitudinal magnetic fields. It will become apparent that the fields may be cross fields. The fields may be steady magnetic fields such as could be induced by d-c currents or permanent magnets or alternating fields such as would be induced by a-c currents.

The induced eddy currents in the superconducting sheet 21 generate the repulsive magnetic field. The fields are generated in the sheet when the sheet is first brought into cooperation with the magnetic fields because of the change in flux. Thereafter, the currents persist in view of the fact that the sheet is a superconducting sheet. In accordance with the Meissner effect, the magnetic field above the sheet is zero because the currents flow primarily on the lower surface of the sheet and the superconducting material rejects magnetic fields. The interaction generates a force $F_L$. The force $F_L$ is present whether or not the train is moving because of the persistent currents in the film or sheet 21. In contrast, in the prior art the train was required to move in order to induce the magnetic fields in the conductive sheet to provide the lifting forces. When the superconducting sheet is placed in the chassis of a vehicle, no magnetic fields extend upwardly into the passenger compartment; thus, there is no requirement for elaborate magnetic shielding.

If it is desired to provide propulsion forces then the magnetic fields 22 may be moving magnetic fields generated by suitable switching means associated with the coils. Such switching and magnetic field generating systems are well known in the linear motor art.

Figure 3:
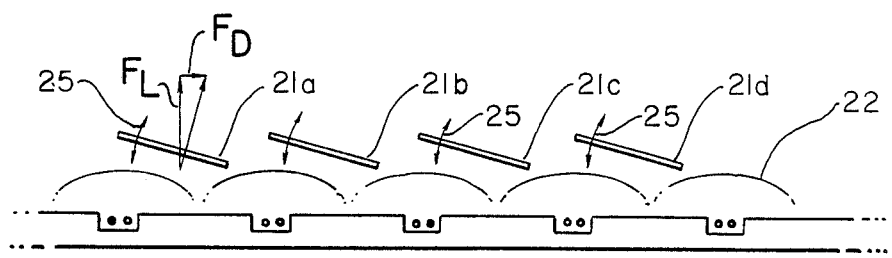
FIG. 3 is a side elevational view of a levitation and propulsion system in accordance with this invention.

On the other hand, there is no need for a traveling magnetic field to propel the vehicle. Referring to FIG. 3, the film is shown as broken up into a number of individual films (21a, 21b, etc.) which are shown as being inclined with respect to the longitudinal axis. Thus, a component of the lifting force $F_L$ will also provide a propulsion force $F_P$, as in FIG. 3, which provides the propulsion force to move the train.

By rotating the film, as shown by the arrows 25, it is possible to provide forward braking or reverse forces. It is further apparent that the energy for propelling and lifting the train are generated entirely in the track thereby reducing the amount of the equipment required on board the train. Also, the control of stability can be achieved by controlling the tilt or inclination of the sheets or films whereby as the train travels and additional eddy currents are generated, the sheets can be tilted to lower the lifting force and maintain the spacing of the train with relation to the track. The magnetic fields required for levitating the train can be relatively low in view of the fact that the entire length of train may be provided with sheets or films of superconducting material. The drag force, or eddy current losses, are zero in view of the fact that the sheet is a superconducting sheet and there are no eddy current resistive losses.

Figure 6:
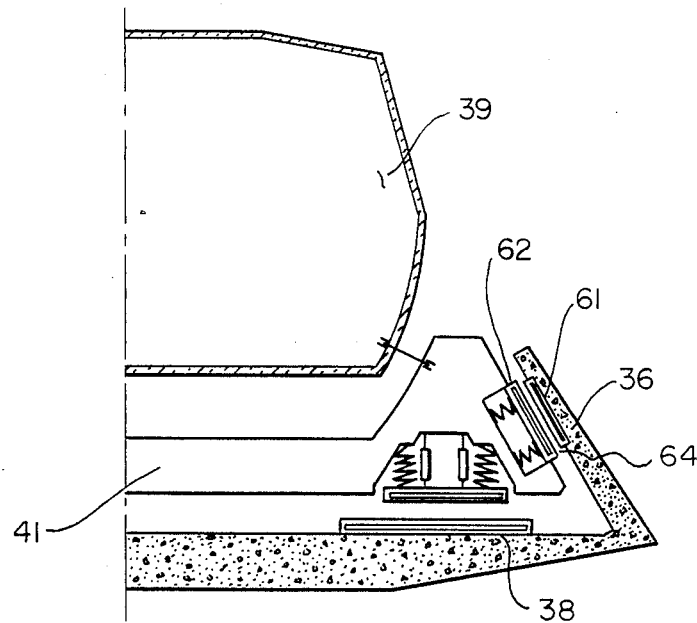
FIG. 6 is a partial sectional view of the train system.

In FIGS. 4–6, the levitational and propulsion system is shown embodied in a train. More particularly, a train 31 is supported on guideway 32 which may, for example, supported along its length by spaced support piers or posts 33. The guideway 32 is C-shaped to include a bottom 34 and upwardly and inwardly extending sides 36. The guideway 32 supports spaced levitation electromagnets 37, 38. The levitation electromagnets may comprise multi-phase or single phase linear windings that can be energized to generate a standing magnetic field or a longitudinally traveling magnetic field depending on the excitation and the type of propulsion system used for the train. The magnetic fields may be steady or alternating and may be generated by permanent magnets.

The train includes a passenger compartment 39 supported on a chassis 41. The passenger compartment is supported from the chassis by active hydraulic bottom and side supports 42 and 43. These supports serve to cushion the passenger compartment as the train travels along the guideway and stabilizes the compartment as the train travels along curves and down inclines. Hydraulic supports and control systems are well known and need not be further described.

The bottom of the chassis includes a plurality of longitudinally extending superconducting assemblies 44 supported from the chassis by springs 46 and hydraulic suspensions 47.

Figure 7:
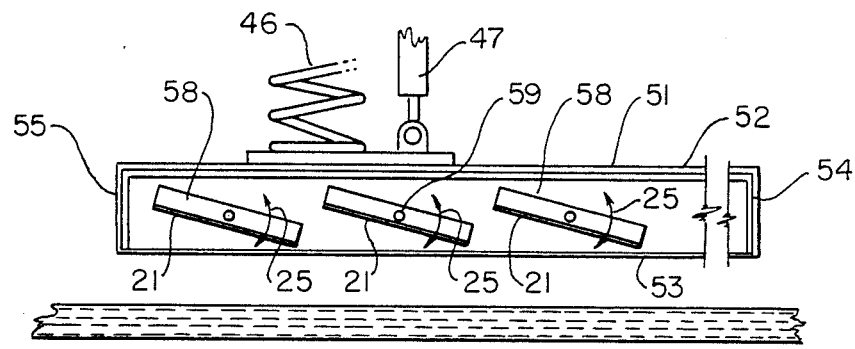
FIG. 7 is a schematic view of the levitational system employing a superconducting sheet.
Figure 8:
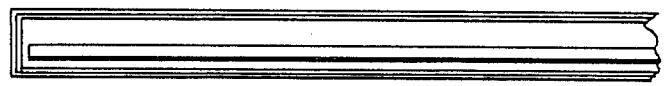
FIG. 8 is a sectional view of another levitational system.

Referring to FIGS. 7–8, the superconducting assemblies 44 include an insulated container 51 which may be a multi-wall container such as a dewar flask which can be filled with a low temperature cooling liquid such as nitrogen. Preferably the container includes top and bottom walls 52 and 53, and sidewalls 54 and 55. The support springs 46 and hydraulic members 47 are schematically illustrated in FIG. 7. The superconducting sheet 21 is applied to a substrate and mounted on supports 58 and pivotably mounted to the side walls of the containers by shafts 59 which are supported by bearings carried by the sidewalls (not shown). One end of the shafts may extend through the wall of the container where it is engaged by suitable drive means that rotate the supports 58 as indicated by the arrow 25. As previously described by tilting the sheets, it is possible to generate propulsion forces which control the train by applying forward, rearward or brake forces.

The train can be maintained in the guideway and guided by means of a similar electromagnet 61 mounted on the guide portion 36 and a superconducting film 62 mounted on the side of the chassis arrangement. Referring to FIG. 5, the upwardly and inwardly extending sides 36 are provided with longitudinal electromagnets 61 which cooperates with on-board films or sheets supported in a dewar flask 64. The films may be a continuous non-tiltable film whereby only to provide repulsive forces which urge the train to the center of the track and downwardly toward the bottom. The side guards may include pivoted sheets or films whereby the forces can be controlled and additional propulsion, braking and reversing forces generated.

Referring to FIG. 8, there is shown a sheet which is in fixed position within the dewar flask or container. In order to propel the train, the electromagnetic fields generated by the electromagnets 37, 38 need to provide traveling magnetic fields.

The superconducting sheets may be shaped so as to direct and modify the repulsive forces. For example, if the sides are curved upwardly there will be inwardly directed centering forces. They may be shaped to provide better cushioning, etc.

It is seen that the construction of the train is relatively simple. The levitational system employing the superconductor sheets housed within a cooling medium is simple in construction. The use of high temperature superconductor sheets minimizes the requirements for heavy on-board equipment. All the needed power is generated in the track. No fields extend upwardly into the passenger compartment. Thus, there has been provided an improved magnetically levitated train.

What is claimed is:

1. A magnetically levitated vehicle including a guideway, means on said guideway for providing levitational magnetic fields, at least one superconducting sheet carried by said vehicle, said sheet serving to support eddy currents which generate magnetic fields at one surface of said sheet, and positioned so that the magnetic fields at said sheet interact with said guideway levitational magnetic fields thereby generating repulsion forces for levitating said vehicle, said magnetically levitated vehicle including means for tiltably mounting said sheet, whereby interaction of said fields provides propulsion or braking forces dependent upon the direction of tilt.

2. A magnetically levitated train as in claim 1 including container means for housing said sheets and a low temperature liquid in said container for maintaining said sheets at superconducting temperature.

3. A magnetically levitated vehicle as in claim 1 in which there are provided a plurality of superconducting sheets disposed along the vehicle.

4. A magnetically levitated train as in claim 1 in which said sheets are shaped to provide predetermined forces.

5. A magnetically levitated vehicle as in claim 1 in which said levitational magnetic fields are electromagnetic fields.

6. A magnetically levitated train as in claim 5 in which the levitational magnetic fields are alternating fields.

7. A magnetically levitated train as in claim 1 in which said guideway includes upwardly extending sides, means for providing inwardly extending magnetic fields along said sides and at least one superconducting sheet carried on each side of said vehicle for interaction with the side fields for guiding the vehicle along the guideway.

8. A magnetically levitated vehicle as in claim 7 in which the sides are inclined inwardly to generate downwardly directed magnetic fields and in which said sheets cooperate therewith to generate downwardly directed forces.

9. A magnetically levitated vehicle including a guideway, means on said guideway for providing levitational magnetic fields along said guideway on each side thereof, a plurality of superconducting sheets carried on each side of said vehicle, said sheets serving to support eddy currents which generate magnetic fields at one surface of said sheets, said sheets positioned so that the magnetic fields at said sheets interact with the guideway levitational magnetic fields thereby providing repulsion forces to levitate said vehicle, said magnetically levitated vehicle including meas for tiltably mounting said sheet whereby interaction of said fields provides propulsion or braking forces dependent upon the direction of tilt.

10. A magnetically levitated train as in claim 9 in which said guideway includes upwardly extending sides, means for providing inwardly extending magnetic fields along said sides and at least one superconducting sheet carried on each side of said vehicle for interaction with the side fields for guiding the vehicle along the guideway.

11. A magnetically levitated vehicle as in claim 10 in which the sides are inclined inwardly to generate downwardly directed magnetic fields and in which said sheets cooperate therewith to generate downwardly directed forces.

12. A magnetically levitated vehicle as in claim 9 in which there are provided a plurality of superconducting sheets disposed along the vehicle.

13. A magnetically levitated vehicle as in claim 9 in which said sheets are shaped to provide predetermined forces.

14. A magnetically levitated vehicle as in claim 9 in which said levitational magnetic fields are electromagnetic fields.

15. A magnetically levitated train as in claim 14 in which the levitational magnetic fields are alternating fields.

16. A magnetically levitated train as in claim 9 including container means for housing said sheets and a low temperature liquid in said container for maintaining said sheets at superconducting temperature.

* * * * *